US008492065B2

(12) United States Patent
Chung et al.

(10) Patent No.: US 8,492,065 B2
(45) Date of Patent: *Jul. 23, 2013

(54) LATEX PROCESSES

(75) Inventors: Joo T. Chung, Webster, NY (US); Zhen Lai, Webster, NY (US); Chieh-Min Cheng, Rochester, NY (US); Joseph L. Leonardo, Penfield, NY (US); Yuhua Tong, Webster, NY (US); Timothy L. Lincoln, Rochester, NY (US); Samir Kumar, Pittsford, NY (US); Christine Louise DeMay, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 1423 days.

This patent is subject to a terminal disclaimer.

(21) Appl. No.: 12/056,529

(22) Filed: Mar. 27, 2008

(65) Prior Publication Data
US 2009/0246680 A1    Oct. 1, 2009

(51) Int. Cl.
*G03G 9/087* (2006.01)

(52) U.S. Cl.
USPC .......... 430/137.14; 430/137.15; 523/300; 523/333; 523/335; 523/336

(58) Field of Classification Search
USPC  430/109.4, 137.14, 137.15, 137.16; 523/335, 523/333, 300, 336
See application file for complete search history.

(56) References Cited

U.S. PATENT DOCUMENTS

| 3,590,000 A | 6/1971 | Palermiti et al. |
| 3,655,374 A | 4/1972 | Palermiti et al. |
| 3,720,617 A | 3/1973 | Chatterji et al. |
| 3,944,493 A | 3/1976 | Jadwin et al. |
| 3,983,045 A | 9/1976 | Jugle et al. |
| 4,007,293 A | 2/1977 | Mincer et al. |
| 4,079,014 A | 3/1978 | Burness et al. |
| 4,265,990 A | 5/1981 | Stolka et al. |
| 4,394,430 A | 7/1983 | Jadwin et al. |
| 4,478,923 A * | 10/1984 | De Roo et al. ............. 430/108.2 |
| 4,560,635 A | 12/1985 | Hoffend et al. |
| 4,563,408 A | 1/1986 | Lin et al. |
| 4,584,253 A | 4/1986 | Lin et al. |
| 4,858,884 A | 8/1989 | Harwath |
| 4,935,326 A | 6/1990 | Creatura et al. |
| 4,937,166 A | 6/1990 | Creatura et al. |
| 5,227,460 A | 7/1993 | Mahabadi et al. |
| 5,278,020 A | 1/1994 | Grushkin et al. |
| 5,290,654 A | 3/1994 | Sacripante et al. |
| 5,308,734 A | 5/1994 | Sacripante et al. |
| 5,344,738 A | 9/1994 | Kmiecik-Lawrynowicz et al. |
| 5,346,797 A | 9/1994 | Kmiecik-Lawrynowicz et al. |
| 5,348,832 A | 9/1994 | Sacripante et al. |
| 5,364,729 A | 11/1994 | Kmiecik-Lawrynowicz et al. |

(Continued)

FOREIGN PATENT DOCUMENTS
EP    1 202 122 A1    5/2002

OTHER PUBLICATIONS

Canadian Patent Office Communication dated Mar. 25, 2011, for Canadian Patent application No. 2,659,232, 2 pages.

(Continued)

*Primary Examiner* — Janis L Dote
(74) *Attorney, Agent, or Firm* — Marylou J. Lavoie

(57) ABSTRACT

Processes for continuously forming latex emulsions useful in preparing toners are provided which do not require the use of solvents.

15 Claims, 7 Drawing Sheets

U.S. PATENT DOCUMENTS

| | | | |
|---|---|---|---|
| 5,366,841 | A | 11/1994 | Patel et al. |
| 5,370,963 | A | 12/1994 | Patel et al. |
| 5,403,693 | A | 4/1995 | Patel et al. |
| 5,405,728 | A | 4/1995 | Hopper et al. |
| 5,418,108 | A | 5/1995 | Kmiecik-Lawrynowicz et al. |
| 5,496,676 | A | 3/1996 | Croucher et al. |
| 5,501,935 | A | 3/1996 | Patel et al. |
| 5,527,658 | A | 6/1996 | Hopper et al. |
| 5,585,215 | A | 12/1996 | Ong et al. |
| 5,650,255 | A | 7/1997 | Ng et al. |
| 5,650,256 | A | 7/1997 | Veregin et al. |
| 5,853,943 | A | 12/1998 | Cheng et al. |
| 6,004,714 | A | 12/1999 | Ciccarelli et al. |
| 6,063,827 | A | 5/2000 | Sacripante et al. |
| 6,190,815 | B1 | 2/2001 | Ciccarelli et al. |
| 6,521,679 | B1 * | 2/2003 | Okada et al. ............... 523/336 |
| 6,593,049 | B1 | 7/2003 | Veregin et al. |
| 6,756,176 | B2 | 6/2004 | Stegamat et al. |
| 6,830,860 | B2 | 12/2004 | Sacripante et al. |
| 2002/0177636 | A1 | 11/2002 | Kawamura et al. |
| 2005/0271965 | A1 * | 12/2005 | Kamiyoshi et al. ........ 430/111.4 |
| 2006/0115759 | A1 * | 6/2006 | Kim et al. ................ 430/109.4 |
| 2006/0223934 | A1 | 10/2006 | Chen et al. |
| 2006/0286478 | A1 | 12/2006 | Chung et al. |
| 2007/0088119 | A1 | 4/2007 | Kamiyoshi et al. |
| 2007/0141494 | A1 | 6/2007 | Zhou et al. |
| 2009/0208864 | A1 * | 8/2009 | Zhou et al. ............... 430/137.14 |

OTHER PUBLICATIONS

Extended European Search Report, EP Application No. 09156524.2-2102, dated Jan. 28, 2011, 5 pages.
Database WPI, Week 200467, Thomson Scientific, London, GB, JP 2004 263027 A, Abstract, 3 pages.
Canadian Patent Office Communication dated Jan. 10, 2012, for Canadian Patent application No. 2,659,232, 3 pages.

\* cited by examiner

LATEX PROCESSES

BACKGROUND

The present disclosure relates to processes for preparing latex emulsions and toners. More specifically, continuous processes for polymerization of a polyester utilizing a polycondensation reaction and continuous processes for emulsification of the polyester are described.

Processes for forming toner compositions for use with electrostatographic, electrophotographic, or xerographic print or copy devices have been previously disclosed. For example, methods of preparing an emulsion aggregation (EA) type toner are known and toners may be formed by aggregating a colorant with a latex polymer formed by batch or semi-continuous emulsion polymerization. For example, U.S. Pat. No. 5,853,943, the disclosure of which is hereby incorporated by reference in its entirety, is directed to a semi-continuous emulsion polymerization process for preparing a latex by first forming a seed polymer. Other examples of emulsion/aggregation/coalescing processes for the preparation of toners are illustrated in U.S. Pat. Nos. 5,290,654, 5,278,020, 5,308,734, 5,370,963, 5,344,738, 5,403,693, 5,418,108, 5,364,729, 5,346,797, the disclosures of each of which are hereby incorporated by reference in their entirety. Other processes are disclosed in U.S. Pat. Nos. 5,348,832, 5,405,728, 5,366,841, 5,496,676, 5,527,658, 5,585,215, 5,650,255, 5,650,256 and 5,501,935, the disclosures of each of which are hereby incorporated by reference in their entirety.

As noted above, latex polymers utilized in the formation of EA type toners may be formed by batch or semi-continuous emulsion polymerization. Batch processes for producing resins may be subjected to bulk polycondensation polymerization in a batch reactor at an elevated temperature. The time required for the polycondensation reaction is long due to heat transfer of the bulk material, high viscosity, and limitations on mass transfer. The resulting resin is then cooled, crushed, and milled prior to being dissolved into a solvent. The dissolved resin is then subjected to a phase inversion process where the polyester resin is dispersed in an aqueous phase to prepare polyester latexes. The solvent is then removed from the aqueous phase by a distillation method.

The use of solvents in this process may cause environmental concerns. For example, if the solvent level is not low enough (<50 ppm), extensive waste water treatment and solvent remediation may be required.

In addition, where a batch process is utilized, because the individual batch process involves the handling of bulk amounts of material, each process takes many hours to complete before moving to the next process in the formation of the toner, that is, aggregation and/or coalescence. In addition, batch-to-batch consistency is frequently difficult to achieve because of variations that may arise from one batch to another.

It would be advantageous to provide a process for the preparation of a latex resin suitable for use in a toner product that is more efficient, takes less time, results in a consistent toner product, and is environmentally friendly.

SUMMARY

The present disclosure provides processes for producing latex particles. In embodiments, a process for the present disclosure includes providing at least one polyester resin possessing at least one acid group in a reaction vessel, neutralizing the at least one acid group by contacting the resin with a base including ammonium hydroxide, potassium hydroxide, sodium hydroxide, sodium carbonate, sodium bicarbonate, lithium hydroxide, potassium carbonate, triethyl amine, triethanolamine, pyridine, pyridine derivatives, diphenylamine, diphenylamine derivatives, poly(ethylene amine), poly(ethylene amine) derivatives, and combinations thereof, emulsifying the neutralized resin by contacting the neutralized resin with at least one surfactant in the absence of a toner solvent to provide a latex emulsion containing latex particles, and continuously recovering the latex particles.

In embodiments, a process of the present disclosure may include preparing at least one polyester resin possessing acid groups by contacting at least one diacid with at least one diol, an optional seed resin and an optional initiator in at least one extruder which spins at a rate of from about 50 rpm to about 1500 rpm, permitting the at least one diacid with at least one diol, optional seed resin and optional initiator to undergo a polycondensation reaction in the at least one extruder, contacting the at least one polyester resin with a base in a neutralization reaction to form a neutralized resin, emulsifying the neutralized resin by contacting the neutralized resin with at least one surfactant in the absence of a toner solvent to provide a latex emulsion containing latex particles, and continuously recovering the latex particles from the at least one extruder.

In other embodiments, a process of the present disclosure may include preparing at least one polyester resin possessing acid groups by contacting at least one diacid with at least one diol, monomer, an optional seed resin and an optional initiator in an extruder and permitting the at least one diacid with at least one diol, optional seed resin and optional initiator to undergo a polycondensation reaction, neutralizing the at least one polyester resin with a base to form a neutralized resin, emulsifying the neutralized resin by contacting the neutralized resin with at least one surfactant in the absence of a toner solvent to provide a latex emulsion containing latex particles, continuously recovering the latex particles, subjecting the latex particles to sound waves at a frequency of from about 15 kHz to about 25 kHz for a period of time from about 5 seconds to about 5 minutes to obtain latex particles of a size of from about 30 nm to about 500 mm, and contacting the latex particles with a colorant and an optional wax to form toner particles.

BRIEF DESCRIPTION OF THE DRAWINGS

Various embodiments of the present disclosure will be described herein below with reference to the figures wherein.

DETAILED DESCRIPTION OF EMBODIMENTS

The present disclosure provides processes for producing resins suitable for use in forming toner compositions. The processes are continuous and solvent-free. In embodiments, neutralization agents may be utilized in the process to accelerate emulsification of the polyester that is produced from continuous condensation polymerization, which may then be utilized to form a polyester emulsion. The resulting resin, in embodiments, may be suitable to form toner.

Processes for making toner compositions in accordance with the present disclosure include a continuous emulsion polymerization process (schematically illustrated in FIG. 1) to provide a latex emulsion in one continuous process, which may then be utilized to produce a toner. The process may occur without the use of a solvent.

Figure 1:
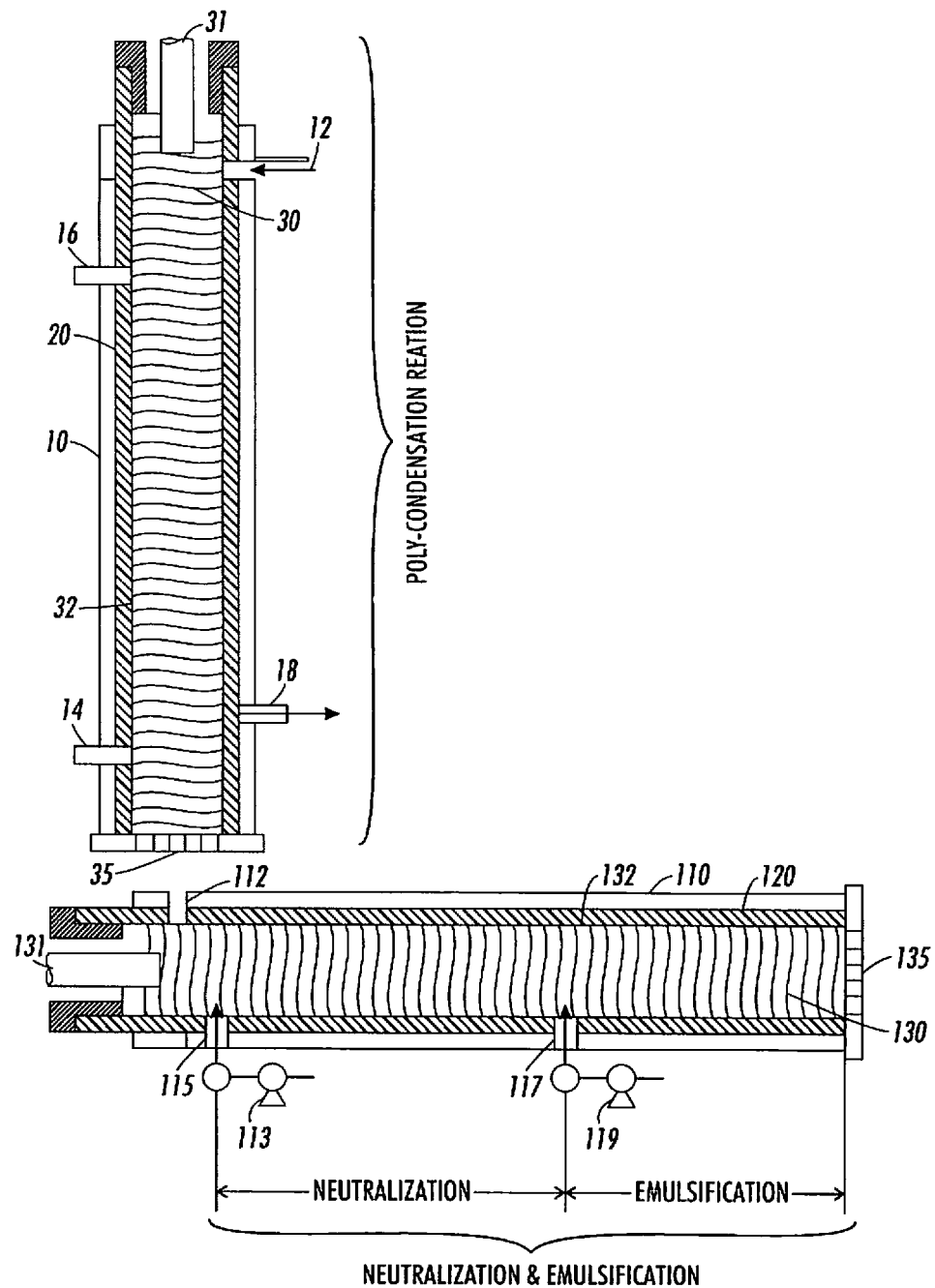
FIG. 1 schematically shows an apparatus suitable for use in connection with a continuous emulsion polymerization process in accordance with embodiments of the present disclosure.

At least one screw extruder may be utilized to form the latex. "At least one" may refer in embodiments, for example, to from about 1 to about 10, in embodiments from about 2 to about 10 in embodiments from about 2 to about 6. In some embodiments, as depicted in FIG. 1 two screw extruders may be utilized to produce a latex.

In embodiments, the process may include three different stages: polycondensation, neutralization and emulsification. In other embodiments, where a pre-made polyester is utilized, the polycondensation step may be omitted and the process may include neutralization and emulsification.

Polycondensation

In embodiments, the process of the present disclosure may utilize at least one screw extruder to produce a latex emulsion in one continuous process. A schematic diagram of a system utilizing a screw extruder to form the latex emulsion is shown in FIG. 1. Such a system can be used for the production of any polymer latex, including a homogeneous latex or a latex possessing structured polymer particles.

In embodiments, the system of FIG. 1 may be utilized to produce a latex emulsion by way of a continuous bulk polycondensation reaction followed by emulsifying the prepared polyester resin into an aqueous phase without using any solvent.

Turning to FIG. 1, preheated liquid reagents or a mixture of reagents can be fed into screw extruder 10 through one or multiple supply ports 12 to enable reactive reagents and substrates to be mixed. The reagents introduced through supply port 12 include any monomer, acid, diol, surfactant, initiator, seed resin, chain transfer agent, crosslinker, and the like, useful in forming the desired latex. In embodiments the reaction may take place under an inert gas such as nitrogen, which may be introduced into screw extruder 10 through access port 14 and may exit screw extruder 10 through outlet port 16. A condenser 18 may also be attached to screw extruder 10 to remove water vapor and nitrogen that is flowing counter current to the reactants. As can be seen in FIG. 1, screw extruder 10 may also include an extruder barrel 20, a screw 30, a screw extruder channel 32, a polyester exit port 35, and optional components (not shown) including heating/cooling systems, thermocouples, and other material supply ports. Screw 30 is driven by shaft 31 which is connected to a drive motor (not shown) in a conventional manner that allows for rotation of screw 30 at speeds of from about 50 rotations per minute ("rpm") to about 1500 rpm, in embodiments from about 250 rpm to about 1000 rpm.

The liquid reagents, optionally preheated to a temperature of from about 80 to about 140, in embodiments from about 90 to about 120, may be used to form the latex, and can be fed into the extruder 10 through one or multiple feed streams and then mixed in the extruder. The spinning of screw 30 both facilitates mixing of the reactants for the polycondensation stage and the travel of the materials through screw extruder 10. The reaction should take place at a suitable temperature of above about 200° C., in embodiments from about 200° C. to about 360° C., in embodiments from about 210° C. to about 325° C., in other embodiments from about 225° C. to about 275° C. The desired residence time of the reactants may be achieved through the extruder design and operation, including liquid feed rate and screw speed. In embodiments, the reactants may reside in screw extruder 10 during the polycondensation reaction for a period of time from about 1 minute to about 100 minutes, in embodiments from about 5 minutes to about 30 minutes.

The liquid reagents may include preformed polyesters or, in embodiments, reagents utilized to form the polyester itself, for example, any acid, alcohol, diacid, diols, and the like useful in forming the desired polyester. Thus, where the ester is itself formed in screw extruder 10, the polycondensation reaction stage can be divided into two sub-steps: esterification and polycondensation. In such a case, at the esterification step, reagents may be introduced into the screw extruder 10 where they undergo esterification in the portion of the screw extruder 10 closer to supply port 12, with polycondensation occurring closer to the end of the screw extruder 10 closer to resin exit port 35.

The rate of polycondensation may be controlled, in part, by controlling the rate of removal of water vapor from the melt, which may result in an increase in the rate of polycondensation. If desired, a slight vacuum may be applied to the system, which, in embodiments, may increase the rate of the polycondensation reaction.

As noted above, in some embodiments nitrogen gas may flow to the reaction system to prevent oxidation and other side reactions.

The end point of the polycondensation reaction can be determined by the desired molecular weight, which correlates to the melt viscosity or acid value of the material. The molecular weight and molecular weight distribution (MWD) can be measured by Gel Permeation Chromatography (GPC). The molecular weight can be from about 3,000 g/mole to about 150,000 g/mole, in embodiments from about 8,000 g/mole to about 100,000 g/mole, in embodiments from about 10,000 g/mole to about 90,000 g/mole.

As noted above, these parameters may be consistently obtained by adjusting the rate of polycondensation by controlling the temperature and removing water during the process.

Resins

Any monomer suitable for preparing a latex can be used in the present processes. Suitable monomers useful in forming the latex, and thus the resulting latex particles in the latex resin include, but are not limited to, styrenes, acrylates, methacrylates, butadienes, isoprenes, acrylic acids, methacrylic acids, acrylonitriles, mixtures thereof, and the like. Any monomer employed may be selected depending upon the particular latex polymer to be utilized. In embodiments, a seed resin, which includes the latex resin to be produced, may be introduced with additional monomers to form the desired latex resin during polycondensation.

In embodiments, the resin of the latex may include at least one polymer. In embodiments, at least one is from about one to about twenty and, in embodiments, from about three to about ten. In embodiments, the polymer utilized to form the latex may be a polyester resin, including the resins described in U.S. Pat. Nos. 6,593,049 and 6,756,176, the disclosures of each of which are hereby incorporated by reference in their entirety. The toners may also include a mixture of an amorphous polyester resin and a crystalline polyester resin as described in U.S. Pat. No. 6,830,860, the disclosure of which is hereby incorporated by reference in its entirety.

In embodiments, as described above, the resin may be a polyester resin formed by the polycondensation process of reacting a diol with a diacid in the presence of an optional catalyst. For forming a crystalline polyester, suitable organic diols include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol and the like; alkali sulfo-aliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixture thereof, and the like. The aliphatic diol may be, for example, selected in an amount of from about 40 to about 60 mole percent of the resin, and the alkali sulfo-aliphatic diol can be selected in an amount of from about 1 to about 10 mole percent of the resin.

Examples of organic diacids or diesters selected for the preparation of the crystalline resins include oxalic acid, succinic acid, glutaric acid, adipic acid, suberic acid, azelaic acid, sebacic acid, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof, and an alkali sulfo-organic diacid such as the sodio, lithio or potassio salt of dimethyl-5-sulfo-isophthalate, dialkyl-5-sulfo-isophthalate-4-sulfo-1,8-naphthalic anhydride, 4-sulfo-phthalic acid, dimethyl-4-sulfo-phthalate, dialkyl-4-sulfo-phthalate, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, 5-sulfo-isophthalic acid, dialkyl-sulfo-terephthalate, sulfoethanediol, 2-sulfopropanediol, 2-sulfobutanediol, 3-sulfopentanediol, 2-sulfohexanediol, 3-sulfo-2-methylpentanediol, 2-sulfo-3,3-dimethylpentanediol, sulfo-p-hydroxybenzoic acid, N,N-bis(2-hydroxyethyl)-2-amino ethane sulfonate, or mixtures thereof. The organic diacid may be selected in an amount of, for example, from about 40 to about 60 mole percent of the resin, and the alkali sulfo-aliphatic diacid can be selected in an amount of from about 1 to about 10 mole percent of the resin.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), alkali copoly(5-sulfoisophthaloyl)-copoly(ethylene-adipate), alkali copoly(5-sulfoisophthaloyl)-copoly(propylene-adipate), alkali copoly(5-sulfoisophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfoisophthaloyl)-copoly(ethylene-succinate), alkali copoly(5-sulfoisophthaloyl)-copoly(propylene-succinate), alkali copoly(5-sulfoisophthaloyl)-copoly(butylenes-succinate), alkali copoly(5-sulfoisophthaloyl)-copoly(pentylene-succinate), alkali copoly(5-sulfoisophthaloyl)-copoly(hexylene-succinate), alkali copoly(5-sulfoisophthaloyl)-copoly(octylene-succinate), alkali copoly(5-sulfo-isophthaloyl)-copoly(ethylene-sebacate), alkali copoly(5-sulfo-isophthaloyl)-copoly(propylene-sebacate), alkali copoly(5-sulfo-isophthaloyl)-copoly(butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), poly(octylene-adipate), wherein alkali is a metal like sodium, lithium or potassium. Examples of polyamides include poly(ethylene-adipamide), poly(propylene-adipamide), poly(butylenes-adipamide), poly(pentylene-adipamide), poly(hexylene-adipamide), poly(octylene-adipamide), poly(ethylene-succinamide), and poly(propylene-sebecamide). Examples of polyimides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), and poly(butylene-succinimide).

The crystalline resin may be present, for example, in an amount of from about 5 to about 30 percent by weight of the toner components, in embodiments from about 15 to about 25 percent by weight of the toner components. The crystalline resin can possess various melting points of, for example, from about 30° C. to about 120° C., in embodiments from about 50° C. to about 90° C. The crystalline resin may have a number average molecular weight ($M_n$), as measured by gel permeation chromatography (GPC) of, for example, from about 1,000 to about 50,000, in embodiments from about 2,000 to about 25,000, and a weight average molecular weight ($M_w$) of, for example, from about 2,000 to about 100,000, in embodiments from about 3,000 to about 80,000, as determined by Gel Permeation Chromatography using polystyrene standards. The molecular weight distribution ($M_w/M_n$) of the crystalline resin may be, for example, from about 2 to about 6, in embodiments from about 2 to about 4.

Examples of diacid or diesters selected for the preparation of amorphous polyesters include dicarboxylic acids or diesters such as terephthalic acid, phthalic acid, isophthalic acid, fumaric acid, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacid or diester may be selected, for example, from about 40 to about 60 mole percent of the resin.

Examples of diols utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis (2-hydroxyethyl) oxide, dipropylene glycol, dibutylene, and combinations thereof. The amount of organic diol selected can vary, and may be, for example, from about 40 to about 60 mole percent of the resin.

Polycondensation catalysts which may be utilized for either the crystalline or amorphous polyesters include tetraalkyl titanates, dialkyltin oxides such as dibutyltin oxide, tetraalkyltins such as dibutyltin dilaurate, dialkyltin oxide hydroxides such as butyltin oxide hydroxide, aluminum alkoxides, alkyl zinc, dialkyl zinc, zinc oxide, stannous oxide, or combinations thereof. Such catalysts may be utilized in amounts of, for example, from about 0.01 mole percent to about 5 mole percent based on the starting diacid or diester used to generate the polyester resin.

Examples of amorphous resins which may be utilized include poly(styrene-acrylate) resins, crosslinked, for example, from about 25 percent to about 70 percent, poly (styrene-acrylate) resins, poly(styrene-methacrylate) resins, crosslinked poly(styrene-methacrylate) resins, poly(styrene-butadiene) resins, crosslinked poly(styrene-butadiene) resins, alkali sulfonated-polyester resins, branched alkali sulfonated-polyester resins, alkali sulfonated-polyimide resins, branched alkali sulfonated-polyimide resins, alkali sulfonated poly(styrene-acrylate) resins, crosslinked alkali sulfonated poly(styrene-acrylate) resins, poly(styrene-methacrylate) resins, crosslinked alkali sulfonated-poly (styrene-methacrylate) resins, alkali sulfonated-poly(styrene-butadiene) resins, and crosslinked alkali sulfonated poly (styrene-butadiene) resins. Alkali sulfonated polyester resins may be useful in embodiments, such as the metal or alkali salts of copoly (ethylene-terephthalate)-copoly(ethylene-5-sulfo-isophthalate), copoly(propylene-terephthalate)-copoly (propylene-5-sulfo-isophthalate), copoly(diethylene-terephthalate)-copoly(diethylene-5-sulfo-isophthalate), copoly (propylene-diethylene-terephthalate)-copoly (propylene-diethylene-5-sulfoisophthalate), copoly(propylene-butylene-terephthalate)-copoly(propylene-butylene-5-sulfo-isophthalate), copoly(propoxylated bisphenol-A-fumarate)-copoly(propoxylated bisphenol A-5-sulfo-isophthalate), copoly(ethoxylated bisphenol-A-fumarate)-copoly(ethoxylated bisphenol-A-5-sulfo-isophthalate), and copoly(ethoxylated bisphenol-A-maleate)-copoly(ethoxylated bisphenol-A-5-sulfo-isophthalate), and wherein the alkali metal is, for example, a sodium, lithium or potassium ion.

Other examples of suitable latex resins or polymers which may be produced include, but are not limited to, poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly (ethyl acrylate-butadiene), poly(propyl acrylate-butadiene), poly(butyl acrylate-butadiene), poly(styrene-isoprene), poly (methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), and poly(styrene-butyl acrylate-acrylonitrile-acrylic acid), and combinations thereof. The polymer may be block, random, or alternating copolymers.

In addition, polyester resins obtained from the reaction of bisphenol A and propylene oxide or propylene carbonate, and in particular including such polyesters followed by the reaction of the resulting product with fumaric acid (as disclosed in U.S. Pat. No. 5,227,460, the disclosure of which is hereby incorporated by reference in its entirety), and branched polyester resins resulting from the reaction of dimethylterephthalate with 1,3-butanediol, 1,2-propanediol, and pentaerythritol may also be used.

In embodiments, an amorphous polyester resin, for example a polypropoxylated bisphenol A fumarate polyester, may be prepared in the continuous process of the present disclosure and then utilized to form a toner composition. Examples of a suitable poly(propoxylated bisphenol A cofumarate) include those disclosed in U.S. Pat. No. 6,063,827, the disclosure of which is hereby incorporated by reference in its entirety. Bisphenol A, propylene oxide or propylene carbonate and fumaric acid could be utilized as monomeric components in the process of the present disclosure while a propoxylated bisphenol A fumarate may be utilized as a seed resin to facilitate formation of the latex. A linear propoxylated bisphenol A fumarate resin which may be utilized as a seed resin is available under the trade name SPARII from Resana S/A Industrias Quimicas, Sao Paulo Brazil. Other propoxylated bisphenol A fumarate resins that are commercially available include GTUF and FPESL-2 from Kao Corporation, Japan, and EM181635 from Reichhold, Research Triangle Park, North Carolina and the like.

Moreover, where the polycondensation step described above is not required, any pre-made polyester may be subjected to the remaining steps, i.e., neutralization and emulsification, to produce a resin using the continuous solvent-free emulsification process of the present disclosure. Such polyesters include, for example, any of the polyesters or other resins described above, including amorphous and/or semi-crystalline polyesters, such as poly(propoxylated bisphenol A co-fumarates) as described above and crystalline polyesters such as A3C crystalline polyester (a proprietary blend of 1,4-butanediol, fumaric acid, and adipic acid available from Kao Corporation (Japan)).

Examples of initiators which may be added in preparing the latex include water soluble initiators, such as ammonium and potassium persulfates, and organic soluble initiators including peroxides and hydroperoxides including Vazo peroxides, such as VAZO 64™, 2-methyl 2-2'-azobis propanenitlile, VAZO 88™, and 2-2'-azobis isobutyramide dehydrate and mixtures thereof. In embodiments, chain transfer agents may be utilized including dodecane thiol, octane thiol, carbon tetrabromide, mixtures thereof, and the like. The amount of initiator can be from about 0.1 to about 8 percent by weight of the final emulsion composition, in embodiments from about 2 to about 6 percent by weight of the final emulsion composition.

After polycondensation, the resulting polyester may have acid groups at the terminal of the resin. Acid groups which may be present include carboxylic acids, carboxylic anhydrides, carboxylic acid salts, combinations thereof, and the like. The number of carboxylic acid groups may be controlled by adjusting the starting materials and reaction conditions to obtain a resin that possesses excellent emulsion characteristics and a resulting toner that is environmentally durable.

After the above polycondensation process is complete, the materials may be cooled to a temperature of from about 90° C. to about 105° C., in embodiments from about 94° C. to about 100° C., in embodiments about 96° C., and transferred to the next stage.

Neutralization and Emulsification

Once polycondensation is complete, the process materials continue through a screw extruder for neutralization and emulsification. While FIG. 1 depicts the polyester from the polycondensation reaction being transferred to a screw extruder for neutralization and emulsification, in embodiments a pre-made polyester may be obtained and introduced into the screw extruder for neutralization and emulsification. Thus, where a pre-made polyester is utilized, the above polycondensation portion of the process of the present disclosure may be omitted.

Any pre-made resin such as a polyester in an aqueous phase may be subjected to the remaining processes of the present disclosure. In embodiments, the remaining processes of the present disclosure may include a phase inversion process which does not require the use of solvent. Examples of such processes include those disclosed in U.S. Patent Application Publication No. 02007/0141494, the disclosure of which is hereby incorporated by reference in its entirety.

In embodiments, the polyester produced by the polycondensation process described above, or a pre-made polyester as described above, may be subjected to neutralization and emulsification as follows. As depicted in FIG. 1, in embodiments a suitable system for neutralization and emulsification may include screw extruder 110 possessing one or multiple supply ports 112 to receive the polycondensation product from screw extruder 10 or, as noted above, any pre-made polyester that has been processed, in embodiments by melt mixing, neutralization, emulsification and stabilization, combinations thereof, and the like, to obtain small enough particles that may be processed in accordance with the present disclosure to form toner particles. In embodiments a base may be introduced into screw extruder 110 by pump 113 through supply port 115 for neutralization during the neutralization stage. A stabilizer, in embodiments an aqueous stabilizer, may be introduced in to screw extruder 110 by pump 119 through supply port 117 during the emulsification stage. A condenser (not shown) may also be attached to screw extruder 10 to remove water vapor during polycondensation polymerization. As can be seen in FIG. 1, screw extruder 10 may also include an extruder barrel 120, a screw 130, a screw extruder channel 132, an emulsified polyester exit port 135, and optional components (not shown) including heating/cooling systems, thermocouples, and other material supply ports. Screw 130 is driven by shaft 131 which is connected to a drive motor (not shown) in a conventional manner that allows for rotation of screw 130 at speeds of from about 50 rpm to about 1500 rpm, in embodiments from about 100 rpm to about 1000 rpm.

Neutralizing Agent

As noted above, in embodiments carboxylic acid groups may be present on the resin produced in the polycondensation stage or any pre-made polymer, such as amorphous and crystalline polyester resins. Such carboxylic acid groups may be partially neutralized by the introduction of a neutralizing agent, in embodiments a base solution, during the neutralization stage. Suitable bases which may be utilized for this neutralization include, but are not limited to, ammonium hydroxide, potassium hydroxide, sodium hydroxide, sodium carbonate, sodium bicarbonate, lithium hydroxide, potassium carbonate, triethyl amine, triethanolamine, pyridine and its derivatives, diphenylamine and its derivatives, poly(ethylene amine) and its derivatives, combinations thereof; and the like.

After neutralization, the hydrophilicity, and thus the emulsifiability of the resin, may be improved when compared with a resin that did not undergo such neutralization process. The degree of neutralization may be controlled, in embodiments, by the concentration of the base solution added and the feeding rate of the base solution. In embodiments, a base solution may be at a concentration of from about 1% by weight to about 20% by weight, in embodiments from about 2% by weight to about 10% by weight, with the rate of addition of the base solution into the extruder being from about 10 grams per minute to about 50 grams per minute, in embodiments from about 11.25 grams per minute to about 22.5 grams per minute. The resulting partially neutralized melt resin may be at a pH of from about 8 to about 13, in embodiments from about 11 to about 12.

The resulting partially neutralized melt resin may then proceed through screw extruder 110 into the emulsification zone, where a preheated emulsifying agent, in embodiments an aqueous stabilizer, may be added at a controlled rate. As noted above, the process of the present disclosure does not require the use of solvents, as the neutralized resin has excellent emulsifiability in the stabilizers described herein. In embodiments, the preheated aqueous stabilizer may be added under pressure with nitrogen gas to reduce the cycle time of the process and minimize any polyester crystallization. The temperature under which emulsification proceeds should be at least about 20° C. higher than the melting point of the polyester, to permit the proper flow of the resin through the extruder and permit sufficient emulsification of the particles. Suitable temperatures for emulsification will depend upon the polyester resin utilized, but may be from about 80° C. to about 180° C., in embodiments from about 90° C. to about 110° C.

Emulsifying Agents

Suitable stabilizers which may be added at this emulsification stage as emulsifying agents include any surfactant suitable for use in forming a latex resin. Surfactants which may be utilized during the emulsification stage in preparing latexes with the processes of the present disclosure include anionic, cationic, and/or nonionic surfactants. Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abietic acid available from Aldrich, NEOGEN R™, NEOGEN SC™ obtained from Daiichi Kogyo Seiyaku, combinations thereof, and the like. Other suitable anionic surfactants include, in embodiments, DOWFAX™ 2A1, an alkyldiphenyloxide disulfonate from The Dow Chemical Company, and/or TAYCA POWER BN2060 from Tayca Corporation (Japan), which are branched sodium dodecyl benzene sulfonates. Combinations of these surfactants and any of the foregoing anionic surfactants may be utilized in embodiments.

Examples of nonionic surfactants include, but are not limited to alcohols, acids and ethers, for example, polyvinyl alcohol, polyacrylic acid, methalose, methyl cellulose, ethyl cellulose, propyl cellulose, hydroxyethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy)ethanol, mixtures thereof, and the like. In embodiments commercially available surfactants from Rhone-Poulenc such as IGEPAL CA-210™, IGEPAL CA-520™, IGEPAL CA-720™, IGEPAL Co-890™, IGEPAL CO-720™, IGEPAL CO-290™, IGEPAL CA-210™, ANTAROX 890™ and ANTAROX 897™ can be selected.

Examples of cationic surfactants include, but are not limited to, ammoniums, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, and C12, C15, C17 trimethyl ammonium bromides, mixtures thereof, and the like. Other cationic surfactants include cetyl pyridinium bromide, halide salts of quaternized polyoxyethylalkylamines, dodecylbenzyl triethyl ammonium chloride, and the like, and mixtures thereof. The choice of particular surfactants or combinations thereof as well as the amounts of each to be used are within the purview of those skilled in the art.

The desired amount of time for emulsification can be obtained by modifying such aspects of the system of the present disclosure including the extruder design, the speed at which the screw 130 spins as described above, the temperature of the barrels as described above, and the feed rate of the resin into screw extruder 110. The feed rate of resin into screw extruder 110 may be from about 1 pound per hour (lb/hr) to about 70 lb/hr, in embodiments from about 5 lb/hr to about 10 lb/hr. In embodiments, the resin may reside in screw extruder 10 during the neutralization and during the emulsification stage for a period of time from about 30 seconds to about 90 seconds, in embodiments from about 40 seconds to about 60 seconds.

The size of the final polyester particles thus produced and their size distribution may be controlled by adjusting the degree of neutralization of the carboxyl groups, the amount of stabilizer added, and residence time of the resin in the neutralization and emulsification stage. In practice, resins produced in accordance with the present disclosure may have a particle size of from about 30 nm to about 500 nm, in embodiments from about 40 nm to about 300 nm.

For continuous polyester emulsification, the residence time during the various stages of the above process should be long enough to ensure the polymer is emulsified and the suspension is stable.

The resulting emulsion may exit screw extruder 10 by way of polyester exit port 135. The emulsion may be subjected to an optional homogenization step in another screw extruder or any suitable mixing or blending device within the purview of those skilled in the art, for homogenization at a temperature of from about −10° C. to about 100° C., in embodiments from about 80° C. to about 95° C. An additional aqueous stabilizer solution may be added to the emulsion during this optional homogenization step to stabilize the polyester particles. The amount of stabilizer can be from about 0.1 to about 10 percent by weight of the final emulsion composition, in embodiments from about 2 to about 8 percent by weight of the final emulsion composition.

While the above description describes a multiple screw extruder having two screw extruders as depicted in FIG. 1, a single screw extruder with multiple zones, including an esterification zone, polycondensation zone, neutralization zone and emulsion zone may be utilized. Or, multiple screw extruders may be configured so that polycondensation and optional esterification occurs in one extruder, neutralization occurs in a separate extruder, and emulsification occurs in a separate extruder. Other optional steps described above, including homogenization, may be conducted in the same or separate screw extruders.

After addition of a neutralizer and surfactants during emulsification as described above, the neutralization and emulsification portions of the process of the present disclosure may be complete and a latex resin obtained as described above.

In addition, in embodiments, the polyester particles produced may be subjected to sonification to accelerate the formation of particles of a desired nanometer size. Methods for performing such sonification are within the purview of those skilled in the art and include, for example, the application of ultrasound, extrusion, combinations thereof, and similar sources of sound to further break up the polyester particles and reduce the particle sizes. In embodiments, sound waves a frequency of from about 15 kHz to about 25 kHz in embodiments from about 17 kHz to about 22 kHz, may be applied to the resin particles for a period of time from about 5 seconds to about 5 minutes, in embodiments from about 30 seconds to about 3.5 minutes to produce particles having the desired size.

In practice, resins produced in accordance with the present disclosure, optionally in combination with the sonification step described above, may have a particle size of from about 30 nm to about 500 nm, in embodiments from about 50 nm to about 400 nm.

Once obtained, the latex of the present disclosure may be combined with a colorant and other optional ingredients, to produce a toner by processes within the purview of those skilled in the art. For example, in embodiments, the latex resin may be combined with a colorant and optional wax and other ingredients and subjected to aggregation/coalescence/washing to produce a toner.

Colorants

Colorants which may be utilized in a toner of the present disclosure include pigments, dyes, mixtures of pigments and dyes, mixtures of pigments, mixtures of dyes, and the like. The colorant may be, for example, carbon black, cyan, yellow, magenta, red, orange, brown, green, blue, violet or mixtures thereof.

In embodiments wherein the colorant is a pigment, the pigment may be, for example, carbon black, phthalocyanines, quinacridones or RHODAMINE B™ type, red, green, orange, brown, violet, yellow, fluorescent colorants and the like.

The colorant may be present in the toner of the disclosure in an amount of from about 1 to about 25 percent by weight of toner, in embodiments in an amount of from about 2 to about 15 percent by weight of the toner.

Exemplary colorants include carbon black like REGAL 330® magnetites; Mobay magnetites including MO8029™, MO8060™; Columbian magnetites; MAPICO BLACKS™ and surface treated magnetites; Pfizer magnetites including CB4799™, CB5300™, CB5600™, MCX6369™; Bayer magnetites including, BAYFERROX 8600™, 8610™; Northern Pigments magnetites including, NP-604™, NP-608™; Magnox magnetites including TMB-100™, or TMB-104™, HELIOGEN BLUE L6900™, D6840™, D7080™, D7020™, PYLAM OIL BLUE™, PYLAM OIL YELLOW™, PIGMENT BLUE 1™ available from Paul Uhlich and Company, Inc.; PIGMENT VIOLET 1™, PIGMENT RED 48™, LEMON CHROME YELLOW DCC 1026™. E.D. TOLUIDINE RED™ and BON RED C™ available from Dominion Color Corporation, Ltd., Toronto, Ontario; NOVAPERM YELLOW FGL™, HOSTAPERM PINK E™ from Hoechst; and CINQUASIA MAGENTA™ available from E.I. DuPont de Nemours and Company. Other colorants include 2,9-dimethyl-substituted quinacridone and anthraquinone dye identified in the Color Index as CI 60710, CI Dispersed Red 15, diazo dye identified in the Color Index as CI 26050, CI Solvent Red 19, CI 12466, also known as Pigment Red 269, CI 12516, also known as Pigment Red 185, copper tetra(octadecyl sulfonamido) phthalocyanine, x-copper phthalocyanine pigment listed in the Color Index as CI 74160, CI Pigment Blue, Anthrathrene Blue identified in the Color Index as CI 69810, Special Blue X-2137, diarylide yellow 3,3-dichlorobenzidene acetoacetanilides, a monoazo pigment identified in the Color Index as CI 12700, CI Solvent Yellow 16, CI Pigment Yellow 74, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Yellow 180 and Permanent Yellow FGL. Organic soluble dyes having a high purity for the purpose of color gamut which may be utilized include Neopen Yellow 075, Neopen Yellow 159, Neopen Orange 252, Neopen Red 336, Neopen Red 335, Neopen Red 366, Neopen Blue 808, Neopen Black X53, Neopen Black X55, wherein the dyes are selected in various suitable amounts, for example from about 0.5 to about 20 percent by weight, in embodiments, from about 5 to about 20 weight percent of the toner.

Waxes

Wax dispersions may also be added to the latex and colorant to obtain toners of the present disclosure. Suitable waxes include, for example, submicron wax particles in the size range of from about 50 to about 500 nanometers, in embodiments of from about 100 to about 400 nanometers in volume average diameter, suspended in an aqueous phase of water and an ionic surfactant, nonionic surfactant, or mixtures thereof. The ionic surfactant or nonionic surfactant may be present in an amount of from about 0.5 to about 10 percent by weight, and in embodiments of from about 1 to about 5 percent by weight of the wax.

The wax dispersion according to embodiments of the present disclosure includes a wax for example, a natural vegetable wax, natural animal wax, mineral wax and/or synthetic wax. Examples of natural vegetable waxes include, for example, carnauba wax, candelilla wax, Japan wax, and bayberry wax. Examples of natural animal waxes include, for example, beeswax, punic wax, lanolin, lac wax, shellac wax, and spermaceti wax. Mineral waxes include, for example, paraffin wax, microcrystalline wax, montan wax, ozokerite wax, ceresin wax, petrolatum wax, and petroleum wax. Synthetic waxes of the present disclosure include, for example, Fischer-Tropsch wax, acrylate wax, fatty acid amide wax, silicone wax, polytetrafluoroethylene wax, polyethylene wax, polypropylene wax, and mixtures thereof.

Examples of polypropylene and polyethylene waxes include those commercially available from Allied Chemical and Baker Petrolite, wax emulsions available from Michelman Inc. and the Daniels Products Company, EPOLENE® N-15 commercially available from Eastman Chemical Products, Inc., Viscol 550-P™, a low weight average molecular weight polypropylene available from Sanyo Kasel K.K., and similar materials. In embodiments, commercially available polyethylene waxes possess a molecular weight (Mw) of from about 1,000 to about 1,500, and in embodiments of from about 1,250 to about 1,400, while the commercially available polypropylene waxes have a molecular weight of from about 4,000 to about 5,000, and in embodiments of from about 4,250 to about 4,750.

In embodiments, the waxes may be functionalized. Examples of groups added to functionalize waxes include amines, amides, imides, esters, quaternary amines, and/or carboxylic acids. In embodiments, the functionalized waxes may be acrylic polymer emulsions, for example, Joncryl® 74, 89, 130, 537, and 538, all available from Johnson Diversey, Inc. or chlorinated polypropylenes and polyethylenes commercially available from Allied Chemical and Petrolite Corporation and Johnson Diversey, Inc. The wax may be present in an amount of from about 1 to about 30 percent by weight, and in embodiments from about 2 to about 20 percent by weight of the toner.

The wax may be present in an amount of from about 1 to about 30 percent by weight, and in embodiments from about 2 to about 20 percent by weight of the toner.

Toner Processing

The mixture of latex, colorant and optional wax is subsequently coalesced. Coalescing may include stirring and heating at a temperature of from about 90° C. to about 99° C., for a period of from about 0.5 to about 6 hours, and in embodiments from about 2 to about 5 hours. Coalescing may be accelerated by additional stirring.

The pH of the mixture is then lowered to from about 3.5 to about 6 and in embodiments, to from about 3.7 to about 5.5 with, for example, an acid to coalesce the toner aggregates. Suitable acids include, for example, nitric acid, sulfuric acid, hydrochloric acid, citric acid or acetic acid. The amount of acid added may be from about 4 to about 30 percent by weight of the mixture, and in embodiments from about 5 to about 15 percent by weight of the mixture.

The mixture is cooled, washed and dried. Cooling may be at a temperature of from about 20° C. to about 40° C., in embodiments from about 22° C. to about 30° C. over a period time from about 1 hour to about 8 hours, and in embodiments from about 1.5 hours to about 5 hours.

In embodiments, cooling a coalesced toner slurry includes quenching by adding a cooling media such as, for example, ice, dry ice and the like, to effect rapid cooling to a temperature of from about 20° C. to about 40° C., and in embodiments of from about 22° C. to about 30° C. Quenching may be feasible for small quantities of toner, such as, for example, less than about 2 liters, in embodiments from about 0.1 liters to about 1.5 liters. For larger scale processes, such as for example greater than about 10 liters in size, rapid cooling of the toner mixture is not feasible nor practical, neither by the introduction of a cooling medium into the toner mixture, nor by the use of jacketed reactor cooling.

The coalesced toner may then be washed. The washing may be carried out at a pH of from about 7 to about 12, and in embodiments at a pH of from about 9 to about 11. The washing is at a temperature of from about 45° C. to about 70° C., and in embodiments from about 50° C. to about 67° C. The washing may include filtering and reslurrying a filter cake including toner particles in deionized water. The filter cake may be washed one or more times by deionized water, or washed by a single deionized water wash at a pH of about 4 wherein the pH of the slurry is adjusted with an acid, and followed optionally by one or more deionized water washes.

The washed slurry may then be dried. Drying may be carried out at a temperature of from about 35° C. to about 75° C., and in embodiments of from about 45° C. to about 60° C. The drying may be continued until the moisture level of the particles is below a set target of about 1% by weight, in embodiments of less than about 0.7% by weight.

Aggregating Agents

In embodiments, aggregating agents tray be included in forming toner particles of the present disclosure. Any aggregating agent capable of causing complexation might be used in forming toner of the present disclosure. Both alkali earth metal or transition metal salts can be utilized as aggregating agents. In embodiments, alkali (II) salts can be selected to aggregate sodio sulfonated polyester colloids with a colorant to enable the formation of a toner composite. Such salts include, for example, beryllium chloride, beryllium bromide, beryllium iodide, beryllium acetate, beryllium sulfate, magnesium chloride, magnesium bromide, magnesium iodide, magnesium acetate, magnesium sulfate, calcium chloride, calcium bromide, calcium iodide, calcium acetate, calcium sulfate, strontium chloride, strontium bromide, strontium iodide, strontium acetate, strontium sulfate, barium chloride, barium bromide, barium iodide, and optionally mixtures thereof. Examples of transition metal salts or anions which may be utilized as aggregating agent include acetates of vanadium, niobium, tantalum, chromium, molybdenum, tungsten, manganese, iron, ruthenium, cobalt, nickel, copper, zinc, cadmium or silver; acetoacetates of vanadium, niobium, tantalum, chromium, molybdenum, tungsten, manganese, iron, ruthenium, cobalt, nickel, copper, zinc, cadmium or silver; sulfates of vanadium, niobium, tantalum, chromium, molybdenum, tungsten, manganese, iron, ruthenium, cobalt, nickel, copper, zinc, cadmium or silver; and aluminum salts such as aluminum acetate, aluminum halides such as polyaluminum chloride, mixtures thereof, and the like.

Coagulants

In order to aid in the processing of the toner composition, an ionic coagulant having an opposite polarity to any ionic surfactant in the latex (i.e., a counterionic coagulant) may optionally be used in the toner composition. The quantity of coagulant is present to, for example, prevent/minimize the appearance of fines in the final slurry. Fines refers, in embodiments, for example, to small sized particles of less than about 6 microns in average volume diameter, in embodiments from about 2 microns to about 5 microns in average volume diameter, which fines can adversely affect toner yield. Counterionic coagulants may be organic or inorganic entities. Exemplary coagulants that can be included in the toner include polymetal halides, polymetal sulfosilicates, monovalent, divalent or multivalent salts optionally in combination with cationic surfactants, mixtures thereof, and the like. Inorganic cationic coagulants include, for example, polyaluminum chloride (PAC), polyaluminum sulfo silicate (PASS), aluminum sulfate, zinc sulfate, or magnesium sulfate. For example, in embodiments the ionic surfactant of the resin latex dispersion can be an anionic surfactant, and the counterionic coagulant can be a polymetal halide or a polymetal sulfo silicate. When present, the coagulant is used in an amount from about 0.02 to about 2 percent by weight of the total toner composition, in embodiments from about 0.1 to about 1.5 percent by weight of the total toner composition.

Additives

The toner may also include any known charge additives in amounts of from about 0.1 to about 10 weight percent, and in embodiments of from about 0.5 to about 7 weight percent of the toner. Examples of such charge additives include alkyl pyridinium halides, bisulfates, the charge control additives of U.S. Pat. Nos. 3,944,493, 4,007,293, 4,079,014, 4,394,430 and 4,560,635, the disclosures of each of which are hereby incorporated by reference in their entirety, negative charge enhancing additives like aluminum complexes, and the like.

Surface additives can be added to the toner after washing or drying. Examples of such surface additives include, for example, metal salts, metal salts of fatty acids, colloidal silicas, metal oxides, strontium titanates, mixtures thereof, and the like. Surface additives may be present in an amount of from about 0.1 to about 10 weight percent, and in embodiments of from about 0.5 to about 7 weight percent of the toner. Example of such additives include those disclosed in U.S. Pat. Nos. 3,590,000, 3,720,617, 3,655,374 and 3,983,045, the disclosures of each of which are hereby incorporated by reference in their entirety. Other additives include zinc stearate and AEROSIL R972® available from Degussa. The coated silicas of U.S. Pat. Nos. 6,190,815 and 6,004,714, the disclosures of each of which are hereby incorporated by reference in their entirety, can also be present in an amount of from about 0.05 to about 5 percent, and in embodiments of from about 0.1 to about 2 percent of the toner, which additives can be added during the aggregation or blended into the formed toner product.

Uses

Toner particles produced utilizing a latex of the present disclosure may have a size of about 1 micron to about 20 microns, in embodiments about 2 microns to about 15 microns, in embodiments about 3 microns to about 7 microns.

Toner in accordance with the present disclosure can be used in a variety of imaging devices including printers, copy machines, and the like. The toners generated in accordance with the present disclosure are excellent for imaging processes, especially xerographic processes and are capable of providing high quality colored images with excellent image resolution, acceptable signal-to-noise ratio, and image uniformity. Further, toners of the present disclosure can be selected for electrophotographic imaging and printing processes such as digital imaging systems and processes.

Developer compositions can be prepared by mixing the toners obtained with the processes disclosed herein with known carrier particles, including coated carriers, such as steel, ferrites, and the like. Such carriers include those disclosed in U.S. Pat. Nos. 4,937,166 and 4,935,326, the disclosures of each of which are hereby incorporated by reference in their entirety. The carriers may be present from about 2 percent by weight of the toner to about 8 percent by weight of the toner, in embodiments from about 4 percent by weight to about 6 percent by weight of the toner. The carrier particles can also include a core with a polymer coating thereover, such as polymethylmethacrylate (PMMA), having dispersed therein a conductive component like conductive carbon black. Carrier coatings include silicone resins such as methyl silsesquioxanes, fluoropolymers such as polyvinylidiene fluoride, mixtures of resins not in close proximity in the triboelectric series such as polyvinylidiene fluoride and acrylics, thermosetting resins such as acrylics, mixtures thereof and other known components.

Imaging methods are also envisioned with the toners disclosed herein. Such methods include, for example, some of the above patents mentioned above and U.S. Pat. Nos. 4,265,990, 4,858,884, 4,584,253 and 4,563,408, the disclosures of each of which are hereby incorporated by reference in their entirety. The imaging process includes the generation of an image in an electronic printing magnetic image character recognition apparatus and thereafter developing the image with a toner composition of the present disclosure. The formation and development of images on the surface of photoconductive materials by electrostatic means is well known. The basic xerographic process involves placing a uniform electrostatic charge on a photoconductive insulating layer, exposing the layer to a light and shadow image to dissipate the charge on the areas of the layer exposed to the light, and developing the resulting latent electrostatic image by depositing on the image a finely-divided electroscopic material, for example, toner. The toner will normally be attracted to those areas of the layer, which retain a charge, thereby forming a toner image corresponding to the latent electrostatic image. This powder image may then be transferred to a support surface such as paper. The transferred image may subsequently be permanently affixed to the support surface by heat. Instead of latent image formation by uniformly charging the photoconductive layer and then exposing the layer to a light and shadow image, one may form the latent image by directly charging the layer in image configuration. Thereafter, the powder image may be fixed to the photoconductive layer, eliminating the powder image transfer. Other suitable fixing means such as solvent or overcoating treatment may be substituted for the foregoing heat fixing step.

Advantages of the continuous processes of the present disclosure over batch processes include: (1) it does not require large quantities of materials that are necessary in batch processes; (2) it provides much better control of the process (accurate feed control of each component material, better control process temperature, shear, residence time, and the like) and excellent consistency of product quality; (3) it is more energy efficient and environmentally friendly because it is solvent free; (4) it can dramatically reduce production time; (5) it can improve process safety by eliminating the need to handle solvents and materials (unlike in a batch process); (6) it reduces inventory by the fact that it is a just in time process; (7) it allows in situ solvent-free polyester emulsification; (8) it allows for the control of dispersion particle size and size distribution; and (9) it increases productivity and reduces unit manufacturing costs (UMC).

Moreover, the use of neutralization agents as described above, which neutralize the carboxylic groups on the polyester resins, may be utilized in combination with an anionic surfactant as described above to enhance emulsification and the use of a non-ionic surfactant may result in an emulsion having excellent stabilization without the need for solvents.

The following examples illustrate embodiments of the present disclosure. The examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

Example 1

Continuous Solvent free Linear Amorphous Polyester emulsion was made using an extruder as depicted in FIG. 1.

A linear propoxylated bisphenol A fumarate polyester resin, GTUF (commercially available from Kao Corporation, Japan) was fed into the extruder at a rate of about 2 pounds/hour, and an aqueous solution containing deionized water, sodium bicarbonate, and an alkyldiphenyloxide disulfonate ionic surfactant (commercially available as DOWFAX™ 2A1 from the Dow Chemical Company), was pumped into the extruder separately at a rate of about 100 grams/minute down stream in the extruder, which was spinning at about 900 rpm, and at a temperature of about 20° C. The formulation is summarized in Table 1 below:

TABLE 1

| Linear Polyester (GTUF) | 29.28% |
| Sodium bicarbonate | 0.73% |
| Dowfax 2A1 | 1.76% |
| DI Water | 68.23% |

Figure 2:
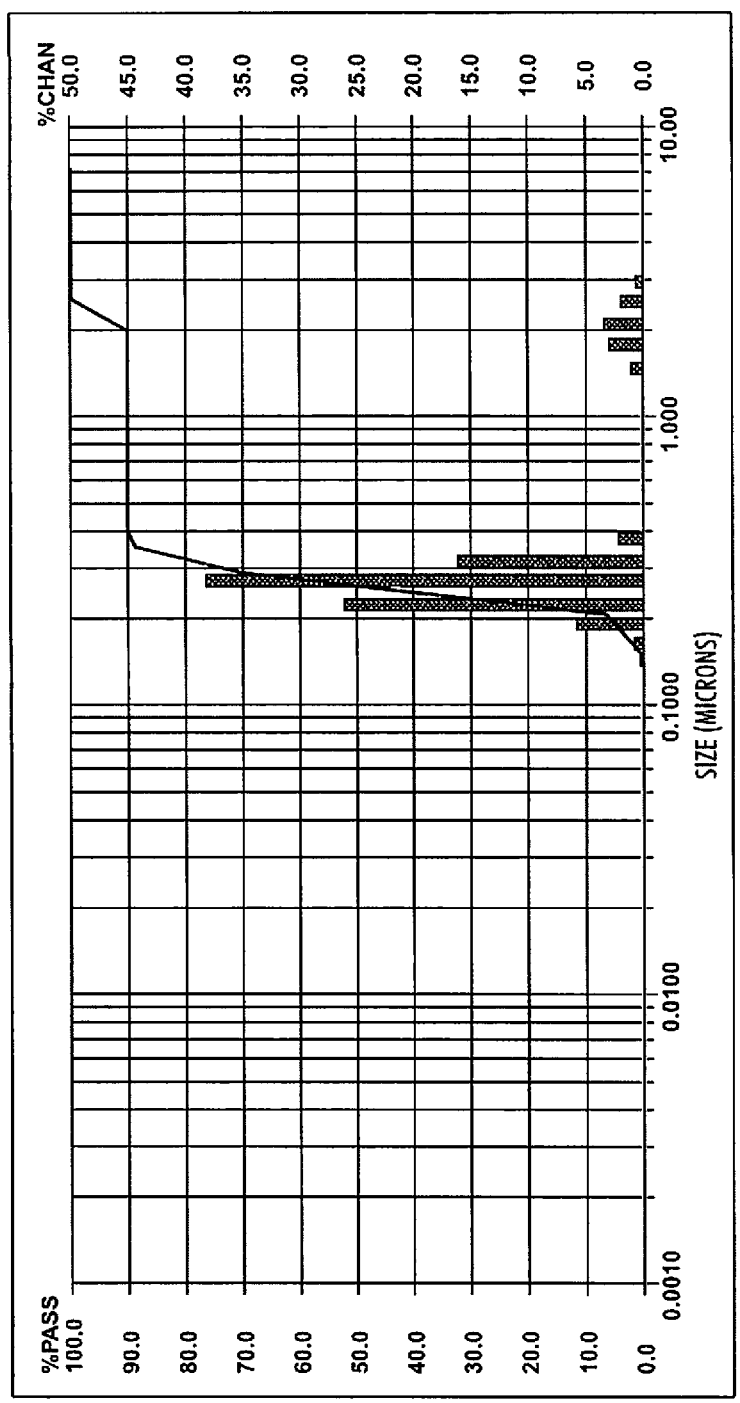
FIG. 2 is a graph depicting particle sizes of resins produced in accordance with the present disclosure.

Emulsified particles were collected at the end of extruder and particles measured. The final particle size of the polyester emulsion after filtration through a 5 micron bag was measured by MicroTrac, and a representative result is shown in FIG. 2 and in Table 2 below.

TABLE 2

2 lb/hr GTUF, 900 rpm, 20° C., 100 g/min Aqueous solution
REACTIVE LATEX

| Summary | Percentiles | | Dia | Vol % | Width |
|---|---|---|---|---|---|
| mv = .4406 | 10% = .2108 | 60% = .2730 | 2.022 | 10% | .8173 |
| mn = .2406 | 20% = .2262 | 70% = .2867 | .2557 | 90% | .0792 |
| ma = .2782 | 30% = .2390 | 80% = .3084 | | | |
| cs = 21.72 | 40% = .2503 | 90% = 1.387 | | | |
| sd = .0510 | 50% = .2613 | 95% = 2.023 | | | | mv = mean diameter of volume distribution
mn = mean diameter of number distribution
ma = mean area distribution
cs = calculated specific surface area
sd = standard deviation
percentiles = percent of particles having a particular volume diameter Example 2

Continuous Solvent free Linear Crystalline Polyester emulsion was made using an extruder as depicted in FIG. 1.

A polyester, A3C crystalline polyester (a proprietary blend of 1,4-butanediol, fumaric acid, and adipic acid available from Kao Corporation (Japan)), was fed into the extruder at a rate of about 4 pounds/hour, and the aqueous solution containing deionized water, sodium bicarbonate and DOWFAX™ 2A1 (an alkyldiphenyloxide disulfonate anionic surfactant from The Dow Chemical Company) was pumped into the extruder separately at a rate of about 100 grams/minute down stream in the extruder, which was spinning at about 1100 rpm, and at a temperature of about 20° C. The formulation is summarized in Table 3 below:

TABLE 3

| Crystalline Polyester (A3C) | 29.28% |
| Sodium bicarbonate | 0.73% |
| Dowfax 2A1 | 1.76% |
| DI Water | 68.23% |

Figure 3:
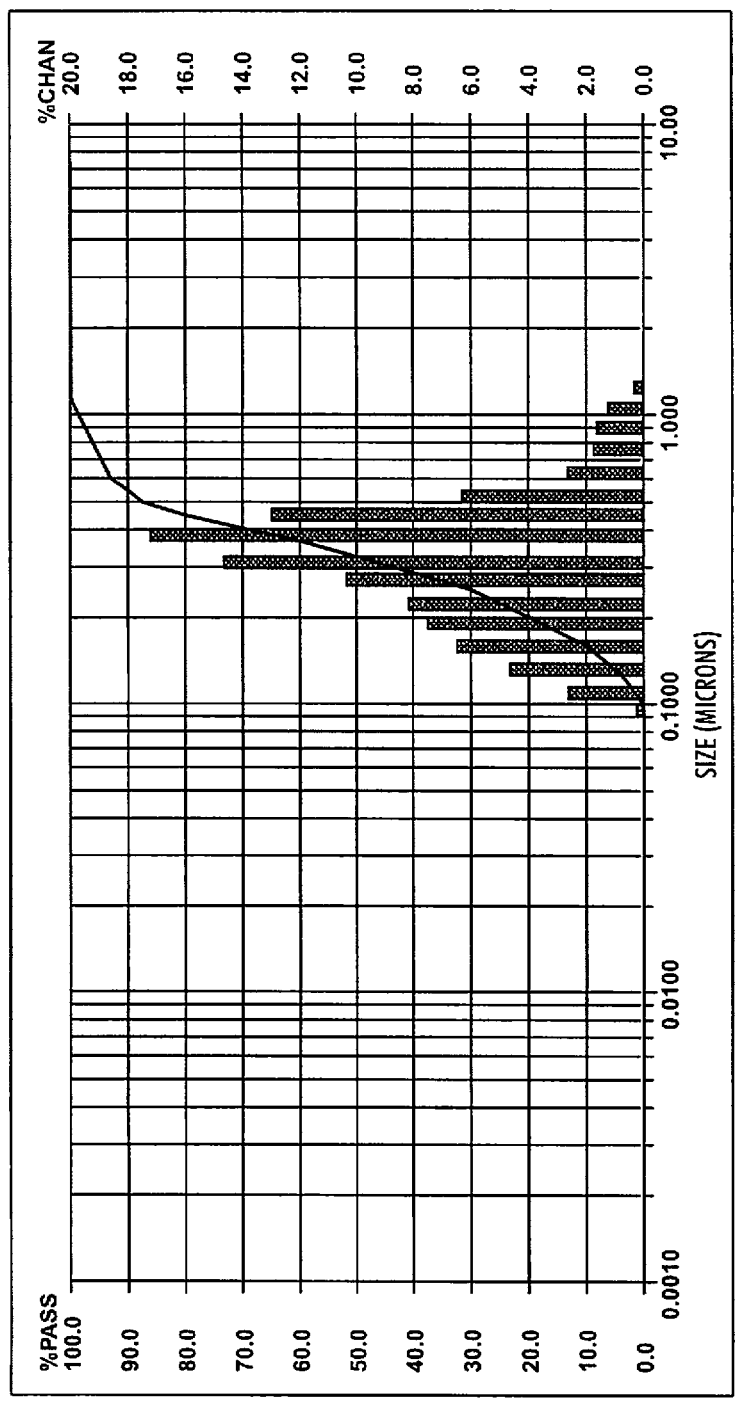
FIG. 3 is a graph depicting particle sizes of resins produced in accordance with the present disclosure.

Emulsified particles were collected at the end of extruder and particles measured as described above in Example 1. The Resulting particle size and size distributions are shown in FIG. 3, with the data also summarized in Table 4 below.

TABLE 4

4 lb/hr A3C, 1100 rpm, 20° C., 100 g/min Aqueous solution
REACTIVE LATEX

| Summary | Percentiles | | Dia | Vol % | Width |
|---|---|---|---|---|---|
| mv = .3474 | 10% = .1535 | 60% = .3602 | 32.44 | 100% | .2947 |
| mn = .1783 | 20% = .1957 | 70% = .3981 | | | |
| ma = .2730 | 30% = .2424 | 80% = .4464 | | | |
| cs = 21.98 | 40% = .2864 | 90% = .5367 | | | |
| sd = .1473 | 50% = .3244 | 95% = .6907 | | | |

The primary particle size (D50) obtained was about 324.4 nm.

Example 3

A high molecular weight amorphous polyester resin, which included a combination of 1,4-benzenedicarboxylic acid with 1,3-dihydro-1,3-dioxo-5-isobenzofurancarboxylic acid, 3-(dodecen-1-yl)dihydro-2,5-furandione, α,α'-[(1-methylethylidene)di-4,1-phenylene]bis[Ω-hydroxypoly(oxy-1,2-ethanediyl)], and α,α'-[(1-methylethylidene)di-4,1-phenylene]bis[Ω-hydroxypoly[oxy(methyl-1,2-ethanediyl)]], was emulsified in a multi-screw extruder. The polyester resin 1 was fed into the extruder at a rate of about 6 pounds/hour and an ionic surfactant (commercially available from Tayca Corporation (Japan)), was injected at a rate of about 166 grams/minute at the down stream followed by injection of about 10% NaOH solution at a rate of about 66 grams/minute. The emulsion was processed in the extruder at a screw speed of about 500 rpm and a barrel temperature of about at 100° C.

Emulsion particles were collected and particle size and size distribution was measured as described above in Example 1.

Figure 4:
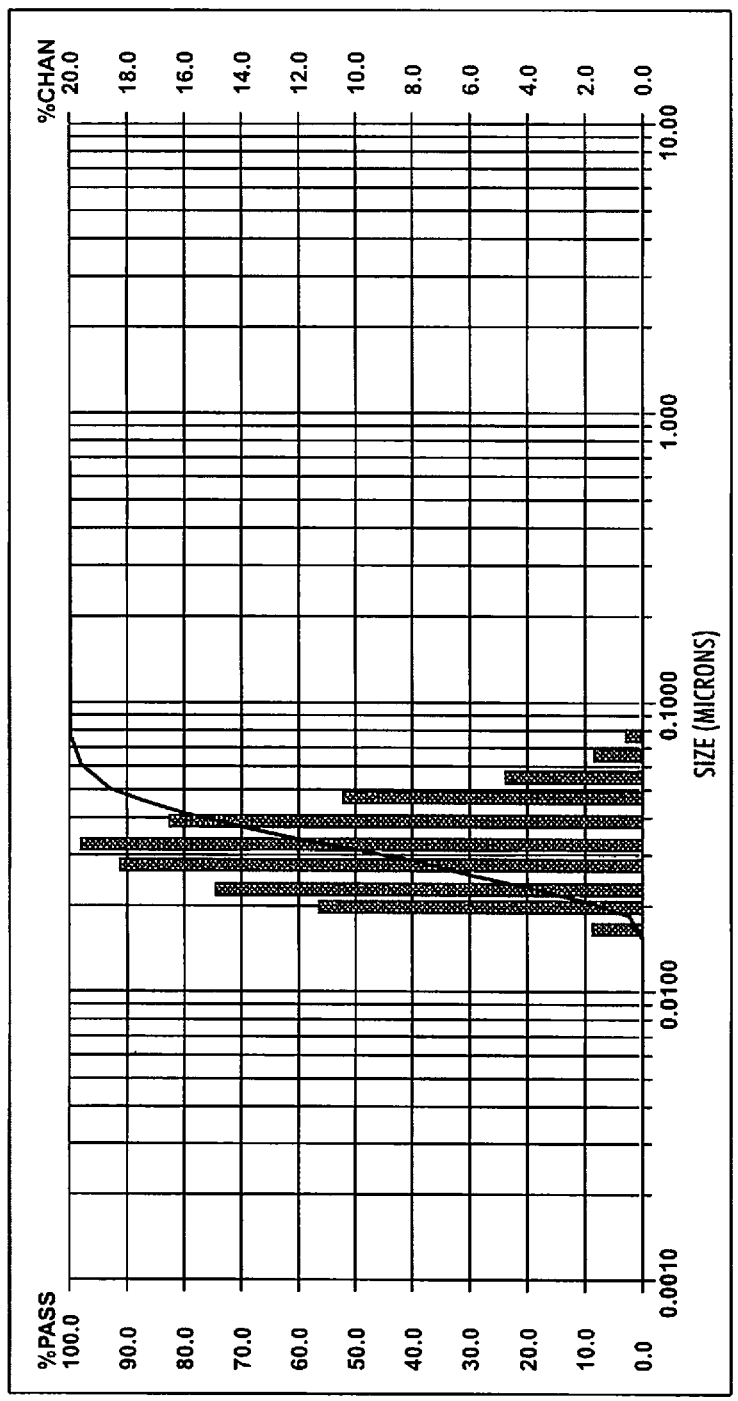
FIG. 4 is a graph depicting particle sizes of resins produced in accordance with the present disclosure.

FIG. 4 and Table 5 below shows the particle size and size distribution of the emulsified polyester resin.

TABLE 5

500 rpm/5.2 lb/hr/166 g/min Tayca surf./66 g/min NaOH
REACTIVE LATEX

| Summary | Percentiles | | Dia | Vol % | Width |
|---|---|---|---|---|---|
| mv = .0334 | 10% = .0207 | 60% = .0343 | .314 | 100% | .0218 |
| mn = .0254 | 20% = .0234 | 70% = .0376 | | | |
| ma = .0301 | 30% = .0261 | 80% = .0419 | | | |
| cs = 199.2 | 40% = .0288 | 90% = .0482 | | | |
| sd = .0109 | 50% = .0314 | 95% = .0548 | | | |

Example 4

A crystalline polyester, a poly(1,9-nonyl dodecanoate), was emulsified in a multi-screw extruder. The polyester resin was fed into the extruder at a rate of about 6 pounds/hour and an ionic surfactant was injected at the down stream at a rate of about 182 grams/minute followed by injection of about 10% NaOH solution at a rate of about 67 grams/minute. The emulsion was processed in the extruder at a screw speed of about 500 rpm and a barrel temperature of about at 100° C.

Figure 5:
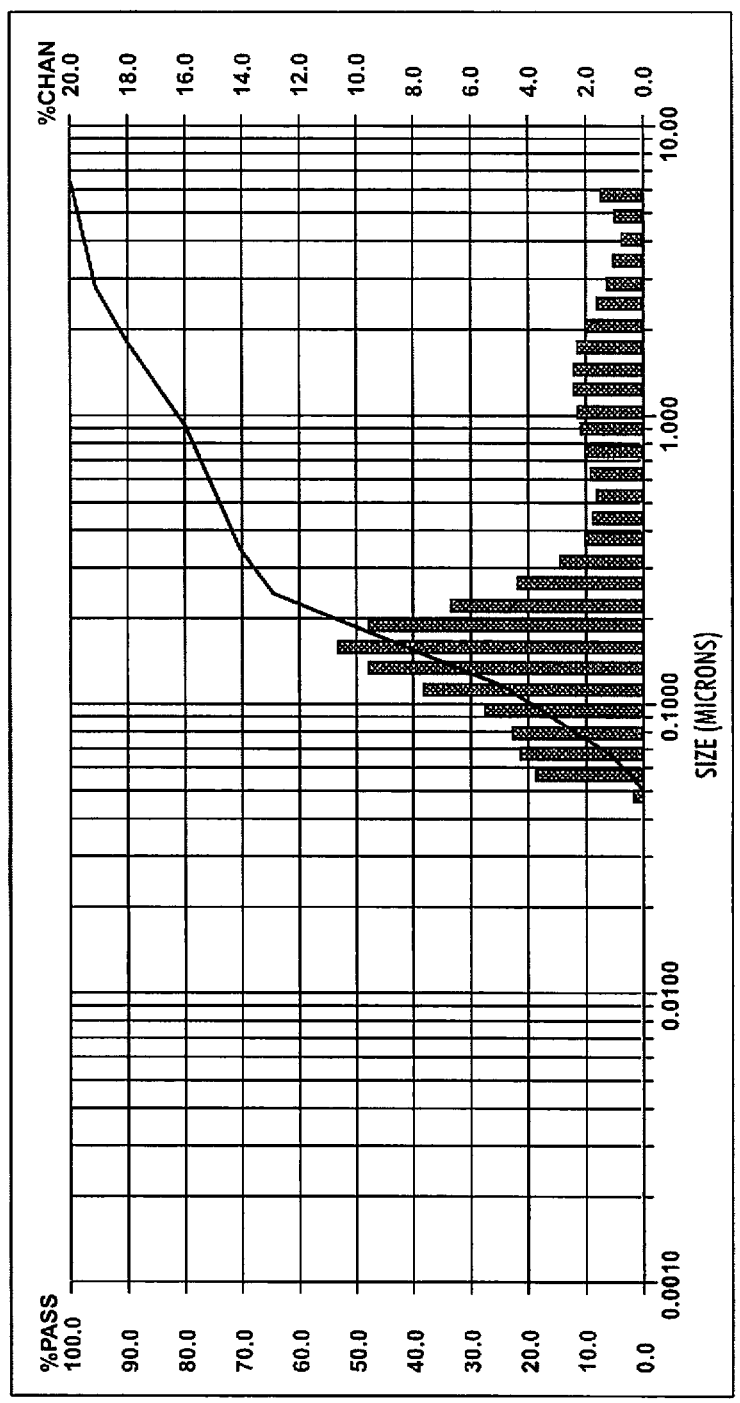
FIG. 5 is a graph depicting particle sizes of resins produced in accordance with the present disclosure.

Emulsion particles were collected and particle size and size distribution was measured as described above in Example 1. FIG. 5 and Table 6 show the particle size and size distribution of the emulsified polyester resin, the results of which are also summarized in Table 6 below.

TABLE 6

500 rpm/5.2 lb/hr/100 C./101 g/min 10% Tayca surf./
79 g/min 0.2% NaOH
REACTIVE LATEX

| Summary | Percentiles | | Dia | Vol % | Width |
|---|---|---|---|---|---|
| mv = .5500 | 10% = .0771 | 60% = .2255 | 5.333 | 3% | 1.741 |
| mn = .0826 | 20% = .1067 | 70% = .3529 | 1.285 | 23% | 1.624 |
| ma = .1668 | 30% = .1317 | 80% = .8723 | .1478 | 74% | .1555 |
| cs = 35.68 | 40% = .1557 | 90% = 1.736 | | | |
| sd = .5423 | 50% = .1837 | 95% = 2.844 | | | |

Example 5

About 16 grams of anionic surfactant (DOWFAX™ 2A1, an alkyldiphenyloxide disulfonate from The Dow Chemical Company at about 47 wt %) was combined with about 8 grams of sodium hydroxide and about 400 grams of an amorphous poly(propoxylated bisphenol A co-fumarate) resin having the following formula:

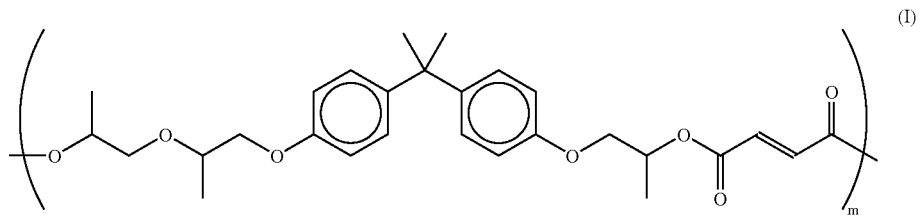

(I)

wherein m is used to adjust viscosity from about 140 to about 150 cPs, to form a blend. The blend was fed into a twin screw extruder (about 15 mm in diameter) at a rate of about 320 grams/hour. The material was processed at a barrel temperature of about 120° C. and a screw speed of about 90 rpm. The process was repeated 4 times and extruded.

Figure 6:
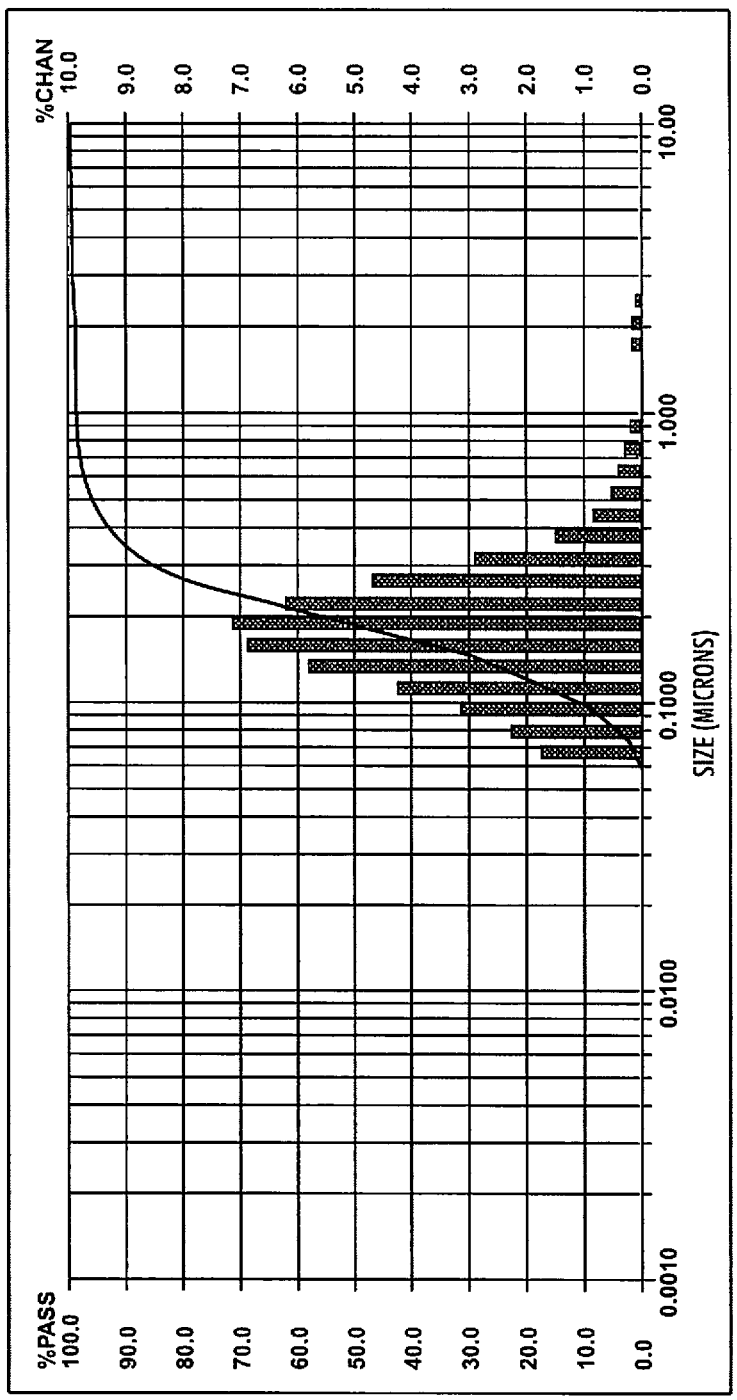
FIG. 6 is a graph depicting particle sizes of resins produced in accordance with the present disclosure that have been subjected to a sonification treatment.

The extruded material was heated to 120° C. with mechanical stirring at a rate of about 6300 rpm. About 500 grams of water, about 2 grams of sodium hydroxide, and about 1 gram of DOWFAX™ 2A1 were added. The resulting milky aqueous solution was cooled to room temperature of from about 20° C. to about 25° C. and subjected to ultrasound utilizing a UIP1000 industrial ultrasonic processor commercially available from Hielscher. The sound waves utilized for this sonification treatment were at a frequency of from about 15 kHz to about 25 kHz. The resulting emulsion possessed resin particles of a size of from about 30 nm to about 500 nm as determined using a MicroTrac, with the resulting particle size and size distributions shown in FIG. 6, with the data also summarized in Table 7 below.

TABLE 7

| Sonified Latex | | | | | |
|---|---|---|---|---|---|
| Summary | Percentiles | | Dia | Vol % | Width |
| mv = .2193 | 10% = .0901 | 60% = .1963 | 2.047 | 1% | .6199 |
| mn = .1046 | 20% = .1139 | 70% = .2237 | .1728 | 99% | .1728 |
| ma = .1559 | 30% = .1343 | 80% = .2616 | | | |
| cs = 38.49 | 40% = .1538 | 90% = .3328 | | | |
| sd = .0891 | 50% = .1739 | 95% = .4371 | | | |

Figure 7:
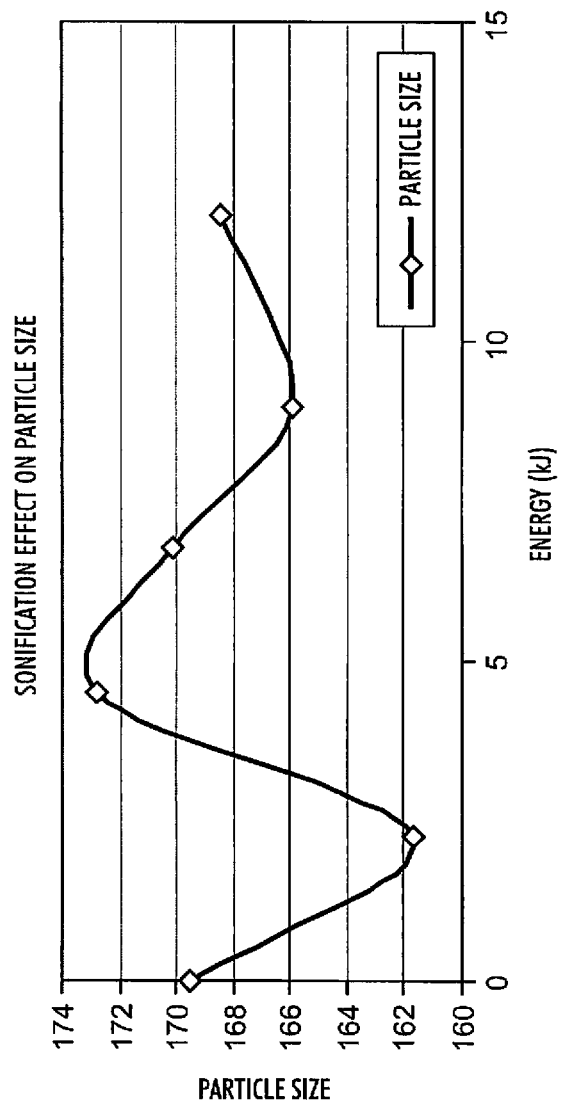
FIG. 7 depicts the energy required for sonification to reduce the particle sizes of resins produced in accordance with the present disclosure.

Mechanical energy generated by the ultrasonic energy source disrupted the latex particles from the probe surface with a given velocity, creating collisions with other particles and cell walls, breaking down the particle size of the latex solids. As can be seen from the above data, sonification resulted in 99% resin particles of about 172.8 nm in size. The effects of additional sonification are summarized in FIG. 7, which demonstrates that only a small amount of energy was required after extrusion to break the particle down to about 162 nm.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A process comprising:
providing at least one polyester resin possessing at least one acid group in at least one extruder by conducting a polycondensation reaction by contacting at least one diacid with at least one diol and with an optional seed resin and optional initiator to form the polyester resin;
wherein the polycondensation reaction occurs in the extruder at a temperature from about 200° C. to about 360° C.;
neutralizing the at least one acid group by contacting the resin with a base selected from the group consisting of ammonium hydroxide, potassium hydroxide, sodium hydroxide, sodium carbonate, sodium bicarbonate, lithium hydroxide, potassium carbonate, triethyl amine, triethanolamine, pyridine, diphenylamine, poly(ethylene amine), and combinations thereof;
emulsifying the neutralized resin by contacting the neutralized resin with an aqueous solution including at least one surfactant in the absence of a solvent to provide a latex emulsion containing latex particles; and
continuously recovering the latex particles.

2. A process as in claim 1, wherein the at least one acid group is selected from the group consisting of carboxylic acids, carboxylic anhydrides, carboxylic acid salts, and combinations thereof.

3. A process as in claim 1, wherein the surfactant is selected from the group consisting of anionic sulfate surfactants, anionic sulfonate surfactants, anionic acid surfactants, nonionic alcohol surfactants, nonionic acid surfactants, nonionic ether surfactants, cationic ammonium surfactants, cationic halide salts of quaternized polyoxyethylalkylamine surfactants, and combinations thereof.

4. A process as in claim 1, wherein the surfactant is selected from the group consisting of sodium dodecylsulfates, sodium dodecylbenzene sulfonates, sodium dodecylnaphthalene sulfate, dialkyl benzenealkyl sulfates, dialkyl benzenealkyl sulfonates, abietic acid, alkyl diphenyloxide disulfonates, branched sodium dodecyl benzene sulfonates, polyvinyl alcohol, polyacrylic acid, methalose, methyl cellulose, ethyl cellulose, propyl cellulose, hydroxyl ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, $C_{12}$ trimethyl ammonium bromide, $C_{15}$ trimethyl ammonium bromide, $C_{17}$ trimethyl ammonium bromide, dodecylbenzyl triethyl ammonium chloride, cetyl pyridinium bromide, and combinations thereof.

5. A process as in claim 1, wherein forming the neutralized resin occurs in the extruder at a pH of from about 8 to about 13 and emulsifying the neutralized resin occurs in the extruder at a temperature from about 80° C. to about 180° C.

6. A process as in claim 1, wherein the at least one extruder spins at a rate of from about 50 rpm to about 1500 rpm.

7. A process as in claim 6, wherein the at least one extruder comprises a single extruder comprising a polycondensation zone, a neutralization zone, and an emulsification zone.

8. A process as in claim 6, wherein the at least one extruder comprises a first extruder comprising a polycondensation zone, and a second extruder comprising a neutralization zone and an emulsification zone.

9. A process as in claim 1, further comprising subjecting the latex particles to sound waves at a frequency of from about 15 kHz to about 25 kHz, for a period of time from about 5 seconds to about 5 minutes, to obtain latex particles of a size of from about 30 nm to about 500 nm.

10. A process comprising:
preparing at least one polyester resin possessing acid groups by contacting at least one diacid with at least one diol, an optional seed resin and an optional initiator in at least one extruder which spins at a rate of from about 50 rpm to about 1500 rpm;
permitting the at least one diacid with at least one diol, optional seed resin and optional initiator to undergo a polycondensation reaction in the at least one extruder;
contacting the at least one polyester resin with a base in a neutralization reaction to form a neutralized resin;
emulsifying the neutralized resin by contacting the neutralized resin with an aqueous solution including at least one surfactant in the absence of a solvent to provide a latex emulsion containing latex particles; and
continuously recovering the latex particles from the at least one extruder.

11. A process as in claim 10, wherein the at least one acid group comprises a carboxylic acid group, and wherein the polycondensation reaction occurs at a temperature of from about 200° C. to about 360° C.

12. A process as in claim 10, wherein the surfactant is selected from the group consisting of sodium dodecylsulfates, sodium dodecylbenzene sulfonates, sodium dodecylnaphthalene sulfate, dialkyl benzenealkyl sulfates, dialkyl benzenealkyl sulfonates, abietic acid, alkyl diphenyloxide disulfonates, branched sodium dodecyl benzene sulfonates, polyvinyl alcohol, polyacrylic acid, methalose, methyl cellulose, ethyl cellulose, propyl cellulose, hydroxyl ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, $C_{12}$ trimethyl ammonium bromide, $C_{15}$ trimethyl ammonium bromide, $C_{17}$ trimethyl ammonium bromide, dodecylbenzyl triethyl ammonium chloride, cetyl pyridinium bromide, and optionally mixtures thereof.

13. A process as in claim 10, further comprising subjecting the latex particles to sound waves at a frequency of from about 15 kHz to about 25 kHz, for a period of time from about 5 seconds to about 5 minutes, to obtain latex particles of a size of from about 30 nm to about 500 nm.

14. A process comprising:
preparing at least one polyester resin possessing acid groups by contacting at least one diacid with at least one diol, monomer, an optional seed resin and an optional initiator in an extruder and permitting the at least one diacid with at least one diol, optional seed resin and optional initiator to undergo a polycondensation reaction;

neutralizing the at least one polyester resin with a base to form a neutralized resin;

emulsifying the neutralized resin by contacting the neutralized resin with an aqueous solution including at least one surfactant in the absence of a solvent to provide a latex emulsion containing latex particles;

continuously recovering the latex particles;

subjecting the latex particles to sound waves at a frequency of from about 15 kHz to about 25 khz, for a period of time from about 5 seconds to about 5 minutes, to obtain latex particles of a size of from about 30 nm to about 500 nm; and contacting the latex particles with a colorant and an optional wax to form toner particles.

15. A process as in claim 14, wherein the colorant is selected from the group consisting of pigments, dyes, mixtures of pigments and dyes, mixtures of pigments, and mixtures of dyes, and the optional wax is selected from the group consisting of natural vegetable waxes, natural animal waxes, mineral waxes and synthetic waxes.

* * * * *